United States Patent
Grey

(10) Patent No.: US 7,519,867 B2
(45) Date of Patent: Apr. 14, 2009

(54) TEST EXECUTIVE WHICH PROVIDES HEAP VALIDITY CHECKING AND MEMORY LEAK DETECTION FOR USER CODE MODULES

(75) Inventor: James A. Grey, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 769 days.

(21) Appl. No.: 11/101,353

(22) Filed: Apr. 7, 2005

(65) Prior Publication Data

US 2006/0143537 A1 Jun. 29, 2006

Related U.S. Application Data

(60) Provisional application No. 60/637,997, filed on Dec. 21, 2004.

(51) Int. Cl.
*G06F 11/00* (2006.01)
(52) U.S. Cl. .......................................... 714/38; 714/46
(58) Field of Classification Search ........................ None
See application file for complete search history.

(56) References Cited

U.S. PATENT DOCUMENTS

| | | | |
|---|---|---|---|
| 5,410,685 A | 4/1995 | Banda et al. | |
| 5,583,988 A | 12/1996 | Crank et al. | |
| 5,590,329 A | 12/1996 | Goodnow, II et al. | |
| 5,625,819 A | 4/1997 | Hoffer, Jr. | |
| 5,809,554 A * | 9/1998 | Benayon et al. | 711/171 |
| 6,110,227 A | 8/2000 | Marcelais et al. | |
| 6,332,211 B1 * | 12/2001 | Pavela | 717/130 |
| 6,397,378 B1 * | 5/2002 | Grey et al. | 717/175 |
| 6,401,220 B1 | 6/2002 | Grey et al. | |
| 6,438,713 B1 | 8/2002 | Taira et al. | |
| 6,473,707 B1 | 10/2002 | Grey | |
| 6,507,842 B1 | 1/2003 | Grey et al. | |
| 6,577,981 B1 | 6/2003 | Grey et al. | |

(Continued)

OTHER PUBLICATIONS

Robertson et al., "Run-time Detection of Heap-based Overflows", Oct. 26-31, 2003, Proceedings of the 17th Large Installation Systems Administration, [http://www.usenix.org/event/lisa03/tech/full_papers/robertson/robertson_html/].*

(Continued)

*Primary Examiner*—Gabriel L Chu
(74) *Attorney, Agent, or Firm*—Meyertons Hood Kivlin Kowert & Goetzel, P.C.; Jeffrey C. Hood; Jason L. Burgess

(57) ABSTRACT

A system and method for automatically detecting heap corruption errors and memory leak errors caused by user-supplied code modules that are called by steps of a test executive sequence. The test executive sequence may first be created by including a plurality of test executive steps in the test executive sequence and configuring at least a subset of the steps to call user-supplied code modules. The test executive sequence may then be executed on a host computer under control of a test executive engine. For each step that calls a user-supplied code module, the test executive engine may perform certain actions to automatically detect whether the user-supplied code module causes a heap corruption error and/or automatically detect whether the user-supplied code module causes a memory leak error.

23 Claims, 7 Drawing Sheets

U.S. PATENT DOCUMENTS

| | | | |
|---|---|---|---|
| 6,594,774 B1 * | 7/2003 | Chapman et al. | 714/2 |
| 6,598,181 B1 | 7/2003 | Pennell | |
| 6,658,649 B1 | 12/2003 | Bates et al. | |
| 6,658,651 B2 | 12/2003 | O'Brien et al. | |
| 6,658,653 B1 | 12/2003 | Bates et al. | |
| 6,671,825 B1 | 12/2003 | Joshi et al. | |
| 6,675,379 B1 | 1/2004 | Kolodner et al. | |
| 6,754,850 B2 | 6/2004 | Grey et al. | |
| 6,829,733 B2 | 12/2004 | Richardson et al. | |
| 6,868,508 B2 | 3/2005 | Grey | |
| 6,907,557 B2 | 6/2005 | Perez et al. | |
| 6,971,084 B2 | 11/2005 | Grey et al. | |
| 7,111,307 B1 * | 9/2006 | Wang | 719/321 |
| 7,181,585 B2 * | 2/2007 | Abrashkevich et al. | 711/170 |
| 2002/0122062 A1 | 9/2002 | Melamed et al. | |
| 2002/0124042 A1 | 9/2002 | Melamed et al. | |
| 2002/0144141 A1 * | 10/2002 | Edwards et al. | 713/200 |
| 2003/0046016 A1 | 3/2003 | Grey et al. | |
| 2003/0046612 A1 | 3/2003 | Grey | |
| 2003/0069876 A1 | 4/2003 | Richardson | |
| 2003/0145252 A1 | 7/2003 | Grey et al. | |
| 2003/0145280 A1 | 7/2003 | Grey et al. | |
| 2003/0182601 A1 | 9/2003 | Richardson | |
| 2004/0054989 A1 * | 3/2004 | Harres | 717/124 |
| 2004/0093180 A1 | 5/2004 | Grey et al. | |
| 2004/0113947 A1 | 6/2004 | Ramchandani | |
| 2004/0143830 A1 | 7/2004 | Gupton et al. | |
| 2004/0172513 A1 * | 9/2004 | Nelson | 711/170 |
| 2005/0144412 A1 * | 6/2005 | Swafford et al. | 711/170 |
| 2006/0136876 A1 | 6/2006 | Melamed et al. | |
| 2006/0143527 A1 | 6/2006 | Grey et al. | |
| 2006/0143536 A1 | 6/2006 | Grey | |

OTHER PUBLICATIONS

Erickson, Cal, "Memory Leak Detection in Embedded Systems", Sep. 2002, Linux Journal, vol. 2002, Issue 101, [http://delivery.acm.org/10.1145/570000/566958/6059.html?key1=566958&key2=2946394121&coll=GUIDE&dl=GUIDE,GUIDE&CFID=35051207&CFTOKEN=68424483].*

* cited by examiner

| Step | Description | Execution Flow | Comment |
|---|---|---|---|
| Power On | Numeric Limit Test, 12 <= x <= 15, volt, Call P... | Precondition | |
| CPU | Call MainSequence in cpu.seq | | |
| ROM | Pass/Fail Test, Call ROMTest (computer.dll) | Precondition | |
| RAM | Pass/Fail Test, Call RAMTest (computer.dll) | Precondition | |
| Video | Numeric Limit Test, 70 <= x <= 75, hertz, Call ... | Precondition | |
| Keyboard | Pass/Fail Test, Call KeyboardTest (computer.dll) | Precondition | |
| ROM Diagnostics | Action, Call ROMDiagnostics (computer.dll) | Precondition | |
| RAM Diagnostics | Action, Call RAMDiagnostics (computer.dll) | Precondition | |
| Video Diagnostics | Action, Call VideoDiagnostics (computer.dll) | Precondition | |
| Keyboard Diagnostics | Action, Call KeyboardDiagnostics (computer.dll) | Precondition | |
| END | | | |

FIG. 4

TEST EXECUTIVE WHICH PROVIDES HEAP VALIDITY CHECKING AND MEMORY LEAK DETECTION FOR USER CODE MODULES

PRIORITY CLAIM

This application claims benefit of priority of U.S. Provisional Application Ser. No. 60/637,997 titled "Test Executive with Features for Detecting and Preventing Errors in User-Supplied Code Modules Called by Steps of a Test Executive Sequence," filed Dec. 21, 2004, whose inventors were James Grey, Erik Crank, Douglas Melamed, and Scott Richardson.

FIELD OF THE INVENTION

The present invention relates to the field of test executive software for organizing and executing test executive sequences. In particular, the invention relates to a system and method for performing automatic heap validity checking and automatic memory leak detection when user-supplied code modules are called by steps of a test executive sequence.

DESCRIPTION OF THE RELATED ART

Test executive software is specialized software that allows a user to create and execute test executive sequences to test units under test (UUTs). The test executive software operates as a control center for an automated test system. More specifically, the test executive software allows the user to create, configure, and control execution of test executive sequences for various test applications, such as production and manufacturing test applications. Text executive software typically includes various features such as test sequencing based on pass/fail results, logging of test results, and test report generation, among others.

A test executive sequence may include a plurality of steps, and one or more of the steps may call user-supplied code modules, also referred to herein as test modules. As used herein, a user-supplied code module or test module refers to a software module that is written or supplied by a user of the test executive software. The user may construct various test modules designed to perform tests on a UUT, and execution of these test modules may be invoked by steps in a test executive sequence when the sequence is executed. For example, the test modules may interact with one or more hardware instruments to test the UUT(s).

The test executive software typically includes a sequence editor for creating test executive sequences and a test executive engine operable to execute the test executive sequences. Executing a test executive sequence may comprise executing each of the steps in the test executive sequence, e.g., executing each of the steps according to an order defined by the test executive sequence.

For each step in the test executive sequence that calls a user-supplied code module, executing the step may comprise both executing program instructions of the test executive engine and executing the user-supplied code module. For example, in addition to calling a user-supplied code module, a step in a test executive sequence may also perform additional functionality, where the additional functionality is implemented by the test executive engine and not coded by the user. For example, the step may be operable to perform common functionality which is useful for various automated test applications, where the common functionality is implemented by the test executive engine. This may remove the burden on the user from implementing this functionality for the step, thus increasing the user's ease and efficiency of creating the automated test system.

As one example, the test executive engine may implement automatic result collection for a step in a test executive sequence. For example, when the step is executed during execution of the test executive sequence, the test executive engine may first invoke execution of a user-supplied code module called by the step. The user-supplied code module may execute to perform a specific test of a UUT. The user-supplied code module may conform to a programming interface through which its execution results can be passed back to the test executive engine. When the user-supplied code module finishes execution, the test executive engine may be operable to automatically receive the execution results of the module and log them in a report file or database. Thus, in this example, the user may implement the specific test functionality performed by the user-supplied code module but may not be required to implement the functionality of logging the execution results of the user-supplied code module since the logging is performed automatically by the test executive engine.

In some instances a test executive sequence may also include one or more steps that do not call user-supplied code modules. For example, the functionality of some steps may be implemented entirely by the test executive engine and may not be coded by the user. However, the test executive software, e.g., the sequence editor, may allow the user to set various properties or parameters affecting operation of the steps, e.g., by interacting with a dialog box or other graphical user interface associated with the steps.

Bugs or errors in user-supplied code modules may cause a test executive sequence to crash when it is executed or to exhibit other problematic behavior. Because test executive sequence execution involves executing both program instructions of the test executive engine and program instructions of user-supplied code modules, it can be difficult for users to determine the source of the error. For example, memory corruption caused by a user-supplied code module can lead to a crash or odd behavior that happens long after the user-supplied code module finishes execution.

The symptoms of problems caused by bugs in user-supplied code modules can be intermittent, difficult to reproduce, and subject to changing or to temporarily disappearing when anything about the system is modified, including modifications intended to help diagnose the problem. Because of this lack of repeatability, these types of bugs are among the most difficult to resolve. They are often referred to as "Heisenbugs", because any attempt to narrow down the problem can change the problem symptoms, somewhat analogous to how any attempt to more accurately determine the location of an electron only makes its momentum more uncertain (from the Heisenberg uncertainty principle).

These type of bugs also have an additional problem in that when they occur due to user-supplied code that is run within the test executive engine's process space, a resulting crash in the test executive application can be interpreted by the user as a vendor bug. This can distract the user from focusing on where the problem is really located and can create a mistaken bad impression of the vendor's test executive application.

One common type of error that can be caused by user-supplied code modules is heap corruption. A heap may comprise a memory pool or store from which memory can be dynamically allocated at runtime during execution of a program. For example, blocks of memory of dynamically determined sizes can be allocated from the heap in an arbitrary order. A memory block allocated from the heap typically remains allocated until it is explicitly de-allocated either by the programmer or by a garbage collector.

For example, heap corruption can occur when a user-supplied code module has a bug causing it to overwrite control information that memory management functions use to control heap usage. Each block of allocated storage within the heap may include a data area as well as a control area adjacent to the data area. For example, the control area may be used by the memory management functions to free the storage properly when the storage is de-allocated. If a user-supplied code module that is called by a step in the test executive sequence overwrites a control structure in the heap (for example, by writing to elements outside the allocated bounds of an array or by copying data into too small a block of allocated storage) then the control information may become corrupted, which may cause errors to occur in execution of the test executive sequence. Heap corruption may also be caused by various other types of errors in user-supplied code modules, such as improper management of dynamic memory allocation.

Another common type of error that can be caused by user-supplied code modules is memory leakage. A memory leak can occur when a user-supplied code module allocates dynamic memory but then does not free the memory. Memory leaks can lead to out-of-memory conditions where there is not sufficient memory for the test executive sequence (or other software running on the host computer) to execute properly.

SUMMARY

One embodiment of the invention comprises a system and method for automatically detecting heap corruption errors caused by user-supplied code modules that are called by steps of a test executive sequence. The test executive sequence may first be created by including a plurality of test executive steps in the test executive sequence and configuring at least a subset of the steps to call user-supplied code modules. For example, a user may interact with a sequence editor which provides a graphical user interface for creating and configuring the test executive sequence.

The test executive sequence may then be executed on a host computer, e.g., may be executed under control of a test executive engine. Executing the test executive sequence may comprise the test executive engine executing each of the steps in the test executive sequence. In one embodiment a step may have "pre-functionality" that is implemented by the test executive engine, i.e., functionality to be performed before a user-supplied code module called by the step is executed. Thus, for each step in the test executive sequence that has pre-functionality, executing the step may comprise the test executive engine executing the pre-functionality of the step.

As described above, user-supplied code modules that contain errors or bugs can cause a heap to become corrupted. In one embodiment the test executive engine may be operable to automatically detect heap corruption errors caused by a user-supplied code module called by a step in the test executive sequence. For example, in one embodiment, for each step in the test executive sequence that calls a user-supplied code module, the test executive engine may check heap validity before executing the user-supplied code module called by the step. In one embodiment, checking heap validity may comprise checking validity of a single heap. In another embodiment, checking heap validity may comprise checking validity of multiple heaps. For example, checking heap validity may comprise checking validity of one or more heaps known to the test executive engine or checking validity of one or more heaps known to be used by the user-supplied code module that is called by the step.

The test executive engine may then invoke execution of the user-supplied code module that is called by the step.

After the user-supplied code module finishes executing, the test executive engine may check heap validity again. In normal operation, the test executive engine should find that the heap(s) are not corrupted (i.e., are valid) after the user-supplied code module called by the step is executed. If the test executive engine finds that one or more heaps are corrupted and these heaps were not corrupted before the user-supplied code module was executed then the heap corruption was most likely caused by the user-supplied code module.

If the test executive engine determines that the user-supplied code module caused the heap(s) to become corrupted then the test executive engine may be operable to report an error in response. In one embodiment the test executive engine may stop execution of the test executive sequence and may display information on the display of the host computer indicating that the user-supplied code module caused the heap(s) to become corrupted. In another embodiment the test executive engine may continue executing the test executive sequence but may log the error, e.g., may log the error in a test results report for the test executive sequence, in a file, or in a database, etc.

In one embodiment a step may have "post-functionality" that is implemented by the test executive engine, i.e., functionality to be performed after a user-supplied code module called by the step is executed. Thus, for each step in the test executive sequence that has post-functionality, executing the step may comprise the test executive engine executing the post-functionality of the step after the user-supplied code module called by the step finishes executing.

In one embodiment the test executive engine may be configured to check heap validity after each user-supplied code module is executed, but may not check heap validity before the user-supplied code modules are executed. By not performing the heap validity checking before each user-supplied code module is executed, the certainty that a user-supplied code module is responsible for a heap corruption error may be slightly decreased, but execution performance of the test executive sequence may be slightly increased.

Another embodiment of the invention comprises a system and method for automatically detecting memory leak errors caused by user-supplied code modules that are called by steps of a test executive sequence. A test executive sequence may be created similarly as described above. In one embodiment, automatic memory leak detection may be enabled or turned on for at least a subset of the test executive steps in the test executive sequence that call user-supplied code modules. As described below, for each test executive step for which automatic memory leak detection is enabled, the test executive engine may be operable to perform certain actions when the step is executed to check whether the user-supplied code module called by the step causes a memory leak.

In one embodiment the user may provide user input indicating which steps to perform automatic memory leak detection for during execution of the test executive sequence. In another embodiment, automatic memory leak detection may be performed by default for every step in the test executive sequence that calls a user-supplied code module. In this embodiment the test executive application may allow the automatic memory leak detection to be disabled or turned off for certain steps in the test executive sequence if desired. For example, some user-supplied code modules may be intentionally designed to not release memory they have allocated before they finish execution. Thus, the automatic memory leak detection may be disabled for steps that call such user-supplied code modules so that memory leaks are not reported for these steps.

After the test executive sequence has been created, the test executive sequence may be executed on a host computer under control of a test executive engine, similarly as described above. Executing the test executive sequence may comprise the test executive engine executing each of the steps in the test executive sequence. In one embodiment a step may have "pre-functionality" that is implemented by the test executive engine, i.e., functionality to be performed before a user-supplied code module called by the step is executed. Thus, for each step in the test executive sequence that has pre-functionality, executing the step may comprise the test executive engine executing the pre-functionality of the step.

If automatic memory leak detection is enabled for the step then the test executive engine may check memory usage before invoking execution of the user-supplied code module called by the step. Checking memory usage may comprise checking or measuring the amount of memory in use for one or more memory pools or stores, i.e., for the memory pool(s) for which memory leak detection is performed. In various embodiments, memory usage for any kind of memory pool may be checked. In one embodiment, checking memory usage may comprise checking the amount of memory in use for or currently allocated for one or more heaps. Thus the test executive engine may be operable to determine whether the user-supplied code module called by the step causes a memory leak with respect to the heap(s), as described below.

The test executive engine may then invoke execution of the user-supplied code module called by the step.

If automatic memory leak detection is enabled for the step then the test executive engine may again check memory usage after the user-supplied code module called by the step finishes executing, e.g., may check memory usage for the one or more heaps or other memory pools that were previously checked. For each memory pool for which memory usage is checked, the test executive engine may compare the memory usage for the memory pool after the user-supplied code module finishes executing to the memory usage for the memory pool before the user-supplied code module was executed to determine whether the user-supplied code module caused a memory leak for the memory pool.

If the test executive engine determines that the user-supplied code module caused a memory leak in one or more heaps or other memory pools then the test executive engine may be operable to report an error in response. In one embodiment the test executive engine may stop execution of the test executive sequence and may display information on the display of the host computer indicating that the user-supplied code module caused a memory leak. In another embodiment the test executive engine may continue executing other steps in the test executive sequence but may log the error, e.g., may log the error in a test results report for the test executive sequence, in a file, or in a database, etc.

In one embodiment the step may have "post-functionality" that is implemented by the test executive engine, i.e., functionality to be performed after the user-supplied code module called by the step is executed. If the step has post-functionality then the test executive engine may execute the post-functionality of the step after the user-supplied code module finishes execution.

BRIEF DESCRIPTION OF THE DRAWINGS

A better understanding of the present invention can be obtained when the following detailed description of the preferred embodiment is considered in conjunction with the following drawings, in which:

FIG. 4 illustrates one example of a test executive sequence, created according to one embodiment of a sequence editor;

Figure 1:
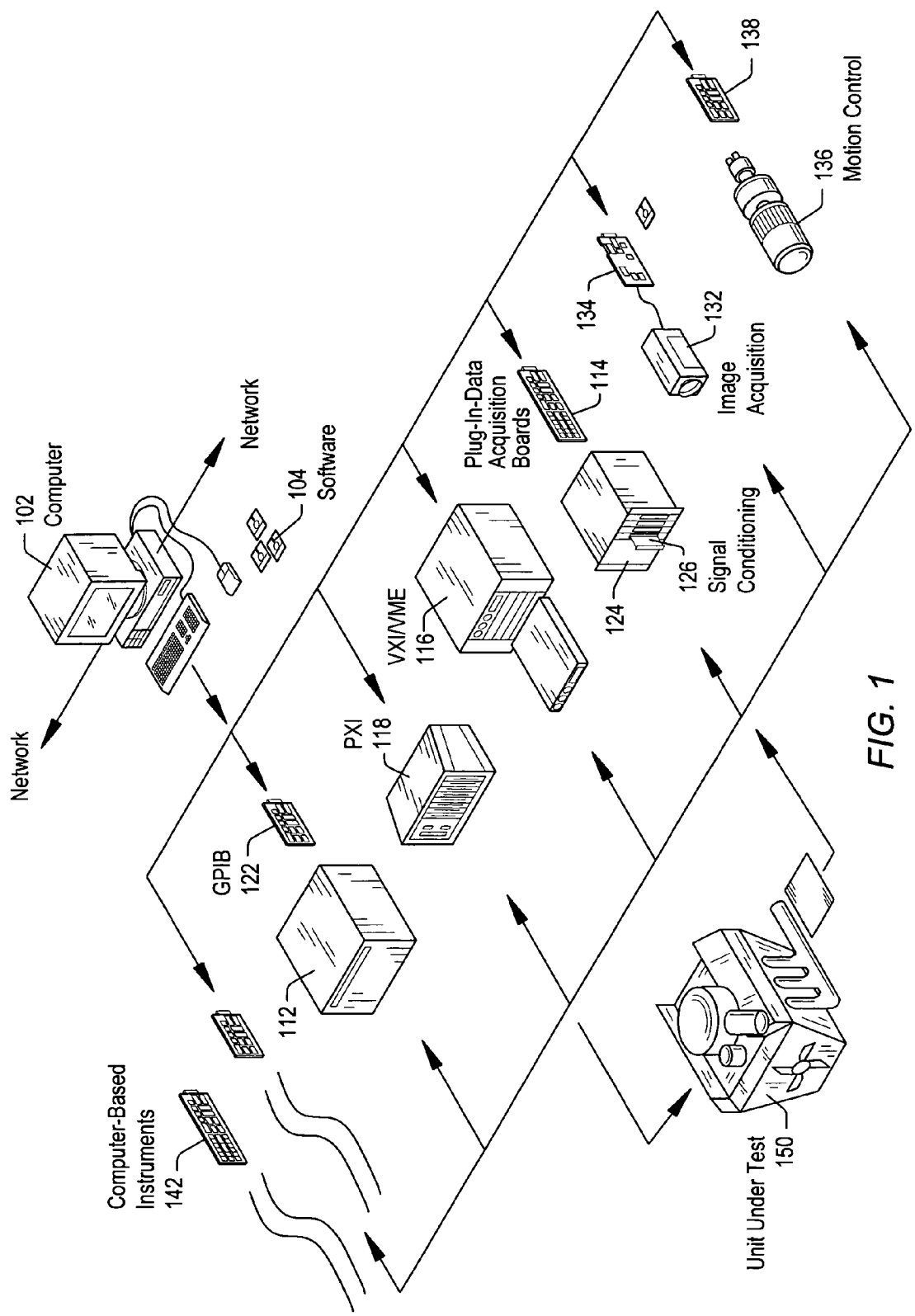
FIG. 1 illustrates an exemplary instrumentation control system according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation by Reference

The following references are hereby incorporated by reference in their entirety as though fully and completely set forth herein.

U.S. Pat. No. 6,401,220 titled "Test Executive System and Method Including Step Types for Improved Configurability," issued Jun. 4, 2002.

U.S. patent application Ser. No. 09/944,546 titled "System and Method Enabling Execution Stop and Restart of a Test Executive Sequence(s)," filed Aug. 31, 2001.

U.S. patent application Ser. No. 10/056,853 titled "Test Executive System Having XML Reporting Capabilities," filed Jan. 25, 2002.

Terms

The following is a glossary of terms used in the present application:

User-Supplied Code Module—A software module or component written by a user. A user-supplied code module may be constructed or packaged in any of various ways and may be created using any of various programming tools or application development environments. For example, a user-supplied code module may be implemented as a function in a Windows Dynamic Link Library (DLL), a LabVIEW graphical program (VI), an ActiveX component, a Java component, or other type of program module or component that implements a specific test or other functionality.

Test Module—A user-supplied code module that performs a test of a UUT.

Test Executive Step—An action that the user can include within a test executive sequence. A step may call a user-supplied code module, e.g., may call a test module to perform a specific test of a UUT. The step may have properties or parameters that can be set by the user, e.g., through a dialog box or other graphical user interface. In addition to calling a user-supplied code module, a step may also have built-in functionality implemented by the test executive software.

Step Module—The user-supplied code module that a test executive step calls.

Test Executive Sequence—A plurality of test executive steps that the user specifies for execution in a particular order. Whether and when a step is executed can depend on the results of previous steps. A test executive sequence may be created using a sequence editor. For example, the sequence editor may create a sequence file or other data structure representing the test executive sequence. A test executive sequence may be executed by a test executive engine.

Sequence File—A file that contains the definition of one or more test executive sequences.

Sequence Editor—A program that provides a graphical user interface for creating, editing, and debugging sequences. One embodiment of a sequence editor is described in detail below.

Test Executive Engine—A program operable to execute a test executive sequence. One embodiment of a test executive engine is described in detail below.

Run-time Operator Interface Application—An application program that provides a graphical user interface for controlling execution of test executive sequences, e.g., on a production station. For example, the graphical user interface of the run-time operator interface application may allow a test operator to start and stop execution of the test executive sequences. A sequence editor and run-time operator interface application can be separate programs or different aspects of the same program. The test executive engine may provide an application programming interface (API) which the run-time operator interface application calls to control execution of the test executive sequences.

Application Development Environment (ADE)—A programming environment such as LabVIEW, LabWindows/CVI, Microsoft Visual C++, Microsoft Visual Basic, etc., in which a user can create user-supplied code modules and run-time operator interface applications.

Unit Under Test (UUT)—A physical device or component that is being tested.

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "graphical user interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window, panel, or dialog box having one or more GUI Elements, or may comprise a plurality of individual GUI Elements (or individual windows each having one or more GUI Elements), wherein the individual GUI Elements or windows may optionally be tiled together.

Graphical User Interface Element—an element of a graphical user interface, such as for providing input or displaying output. Exemplary graphical user interface elements include input controls and output indicators Input Control—a graphical user interface element for providing user input to a program. Exemplary input controls include buttons, check boxes, input text boxes, knobs, sliders, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data from a UUT. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1—Instrumentation System

FIG. 1 illustrates an exemplary instrumentation control system 100. It is noted that FIG. 1 is exemplary only, and the present invention may be used in conjunction with any of various systems, as desired. The system 100 comprises a host computer 102 that connects to one or more instruments. The host computer 102 comprises a CPU, a display screen, memory, and one or more input devices such as a mouse or keyboard as shown.

The computer 102 may execute a test executive sequence operable to analyze, measure, control, or otherwise test a unit under test (UUT) or process 150. For example, the test executive sequence may include various steps that invoke software test modules operable to connect through the one or more instruments to analyze, measure, or control the unit under test (UUT) or process 150. The software test modules that are invoked or called by the steps in the test executive sequence may comprise user-supplied code modules. In other words, the test modules may be written or supplied by a user of the test executive software.

The test executive software may include a test executive engine 220 operable to execute the test executive sequence. As described above, errors in user-supplied code modules that are called by steps in the test executive sequence may cause the test executive sequence to crash when it is executed or to exhibit other problematic behavior. One common type of error that can be caused by user-supplied code modules is heap corruption. In one embodiment the test executive software, e.g., the test executive engine 220, may be operable to automatically detect heap corruption caused by a user-supplied code module during execution of a test executive sequence, as described in detail below.

Another common type of error that can be caused by user-supplied code modules is memory leakage. For example, a memory leak can occur when a user-supplied code module allocates dynamic memory but then does not free the memory. As described below, in one embodiment the test executive software, e.g., the test executive engine 220, may be operable to detect a memory leak caused by a user-supplied code module during execution of a test executive sequence, as described in detail below.

Referring again to FIG. 1, the one or more instruments of the instrumentation control system 100 may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via a GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and optionally interfaces through signal conditioning circuitry 124 to the UUT. The signal conditioning circuitry 124 may include an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or Micro-Channel bus slot provided by the computer 102. However, these cards 122, 134, 138 and 114 are shown external to computer 102 for illustrative purposes. The cards 122, 134, 138 and 114 may also be implemented as external devices coupled to the computer 102, such as through a serial bus.

The VXI chassis or instrument 116 may be coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical systems an instrument will not be present of each interface type, and in fact many systems may only have one or more instruments of a single interface type, such as only GPIB instruments.

The instruments may be coupled to the unit under test (UUT) or process 150, or may be coupled to receive field signals, typically generated by transducers. Other types of instruments or devices may be connected to the instrumentation control system 100, as desired.

The computer 102 may include or may access a memory medium on which test executive software is stored. For example, the test executive software may include a test executive engine 220 which is operable to execute test executive sequences. The test executive software may also include components operable to create and configure test executive sequences, as described below. For example, the memory medium may store a sequence editor 212 such as described below. In one embodiment the memory medium may also store one or more test executive sequences to be executed on the computer 102, as well as possibly storing one or more user-supplied code modules called by steps in the test executive sequences. In one embodiment, one or more of the software elements described above may be included on remote computer systems.

Figure 2:
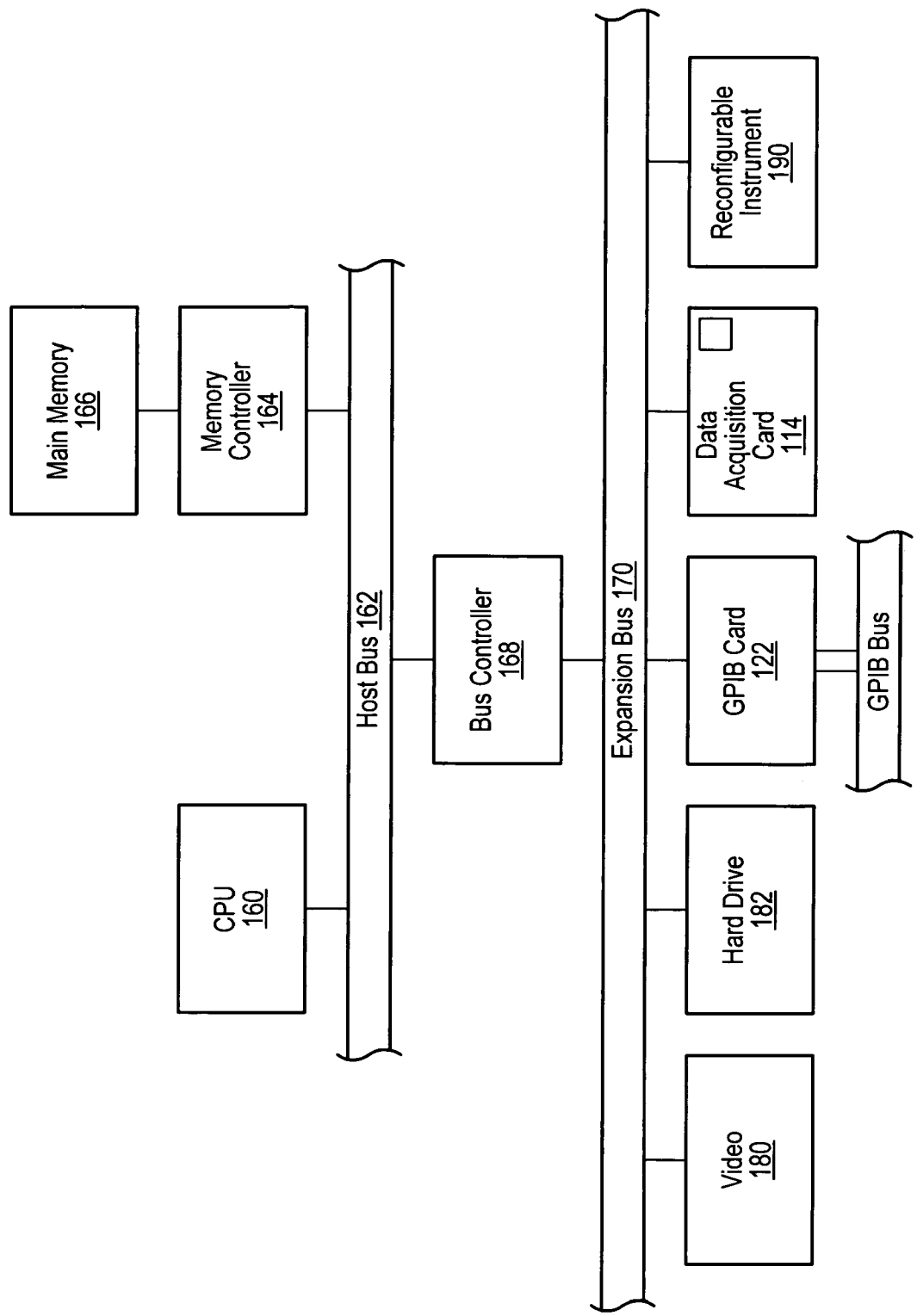
FIG. 2 is a diagram representing one embodiment of the computer system illustrated in FIG. 1.

FIG. 2—Computer System Block Diagram

FIG. 2 is a diagram of the computer system 102 illustrated in FIG. 1, according to one embodiment. It is noted that any type of computer system configuration or architecture can be used as desired, and FIG. 2 illustrates a representative PC embodiment. It is also noted that the computer system 102 may be a general purpose computer system, a computer implemented on a VXI card installed in a VXI chassis, a computer implemented on a PXI card installed in a PXI chassis, or other types of embodiments. Elements of a computer not necessary to understand the present invention have been omitted for simplicity.

In the illustrated embodiment, the computer 102 includes at least one central processing unit or CPU 160 that is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. The main memory 166 may store software such as the software elements described above with reference to FIG. 1. The main memory 166 may also store operating system software as well as other software for operation of the computer system, as well known to those skilled in the art. The CPU 160 executing code and data from the main memory 166 may comprise a means for implementing the methods described below.

The host bus 162 is coupled to an expansion or input/output bus 170 by means of a bus controller 168 or bus bridge logic. The expansion bus 170 may be the PCI (Peripheral Component Interconnect) expansion bus, although other bus types can also be used. The expansion bus 170 may include slots for various devices such as the data acquisition board 114 (of FIG. 1) and a GPIB interface card 122 that provides a GPIB bus interface to the GPIB instrument 112 (of FIG. 1). A video display subsystem 180 and hard drive 182 coupled to the expansion bus 170 is also shown.

In one embodiment, a reconfigurable instrument 190 may also be connected to the computer 102. The reconfigurable instrument 190 may include a functional unit, also referred to as configurable logic, such as a programmable logic device (PLD), e.g., an FPGA, or a processor and memory, which may execute a real time operating system. Program instructions may be downloaded and executed on the reconfigurable instrument 190. In one embodiment, at least a portion of the software described herein may execute on the reconfigurable instrument 190. In various embodiments, the functional unit may be included on an instrument or device connected to the computer through means other than an expansion slot, e.g., the instrument or device may be connected via an IEEE 1394 bus, USB, or other type of port. Also, the functional unit may be included on a device such as the data acquisition board 114 or another device shown in FIG. 1.

Test Executive Software Components

Figure 3:
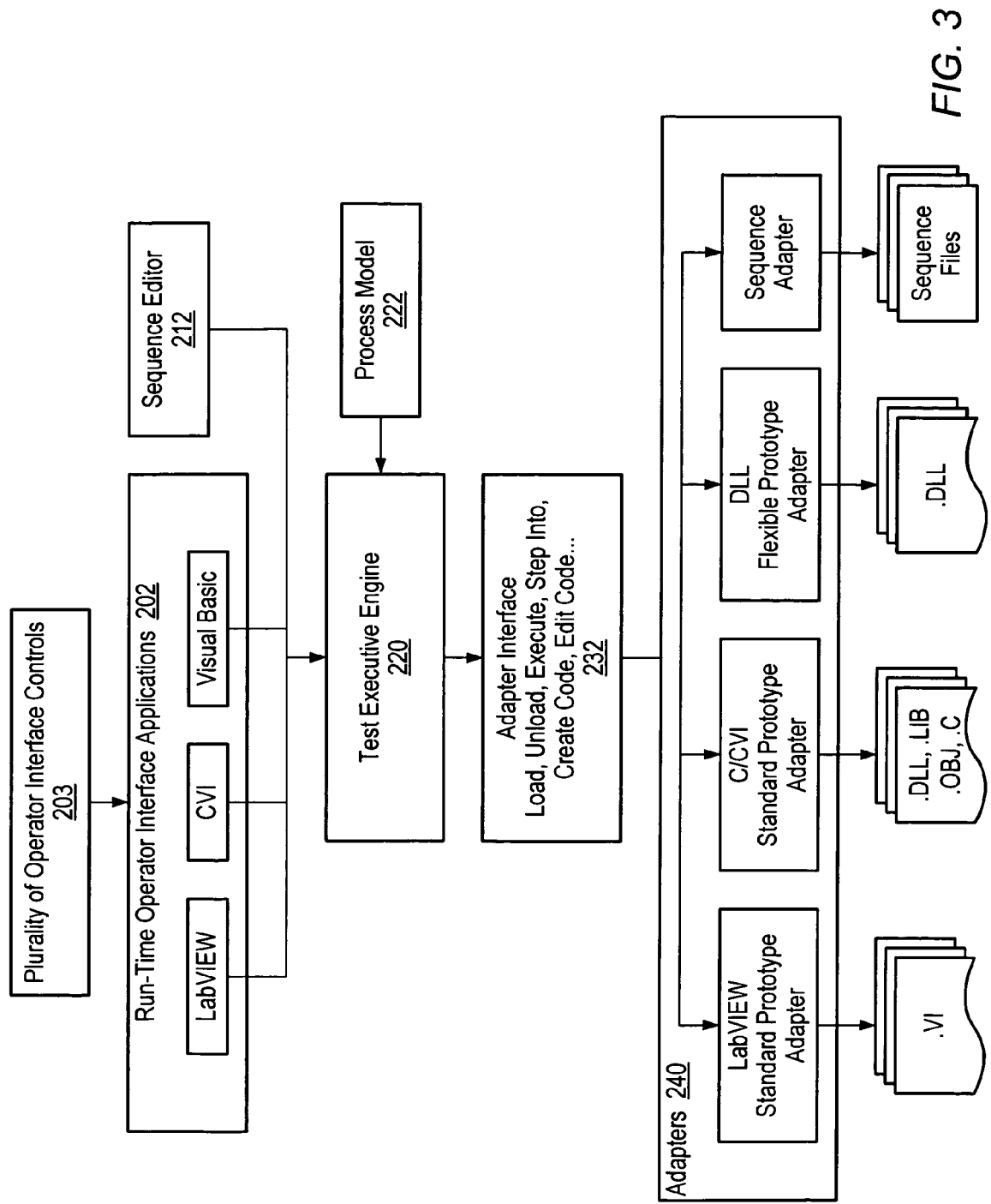
FIG. 3 is a diagram illustrating high-level architectural relationships between elements of a test executive software application according to one embodiment.

FIG. 3 is a block diagram illustrating high-level architectural relationships between elements of a test executive software application according to one embodiment. It is noted that FIG. 3 is exemplary, and in other embodiments the test executive software may have different architectures.

In the embodiment illustrated in FIG. 3, the test executive software includes a sequence editor 212 for creating and editing test executive sequences. The sequence editor 212 may interface to a test executive engine 220. In one embodiment, one or more process models 222 may couple to the test executive engine 220. The test executive engine 220 may interface through an adapter interface 232 to one or more adapters 240. The adapters 240 shown in FIG. 3 include a LabVIEW standard prototype adapter, a C/CVI prototype adapter, a DLL flexible prototype adapter, and a sequence adapter. The LabVIEW standard prototype adapter may interface to user-supplied code modules having a .VI extension, i.e., LabVIEW graphical programs. The C/CVI prototype adapter may interface to user-supplied code modules having a .dll, .lib, .obj, or .c extension. The DLL flexible prototype adapter may interface to user-supplied code modules having a .dll extension. The sequence adapter may interface to sequence files.

The test executive engine 220 may manage the execution of test executive sequences. Test executive sequences include test executive steps that may call external or user-supplied code modules. By using module adapters 240 that have the standard adapter interface 232, the test executive engine 220 may invoke execution of different types of user-supplied code modules. Thus, the test executive may be independent from particular application development environments (ADEs) used to create the user-supplied code modules. In one embodiment, the test executive may use a special type of sequence called a process model to direct the high-level sequence flow. The test executive engine 220 may implement an application programming interface (API) used by the sequence editor 212 and run-time operator interfaces 202.

Sequence Editor

The sequence editor 212 may comprise a program in which the user creates, edits, and/or debugs test executive sequences. The sequence editor 212 may have a graphical user interface (GUI) enabling a user to efficiently create a test executive sequence for testing a physical system or unit under test. The graphical user interface of the sequence editor 212 may enable the user to request or select steps to be added to a test executive sequence and configure the steps. The graphical user interface may provide the user with easy access to test executive features, such as step types, step properties, sequence parameters, step result collection, etc.

FIG. 4 illustrates one example of a test executive sequence, created according to one embodiment of a sequence editor 212. The exemplary test executive sequence of FIG. 4 includes a plurality of test executive steps that call user-supplied code modules operable to test various aspects of a computer system under test. For example, the sequence includes a "ROM" step that calls a user-supplied code module to test the computer's read-only memory, a "RAM" step that calls a user-supplied code module to test the computer's random access memory, etc. Each user-supplied code module called by a step in the test executive sequence may interact with one or more hardware devices or instruments that interface with the computer system under test to perform the desired test.

Figure 5:
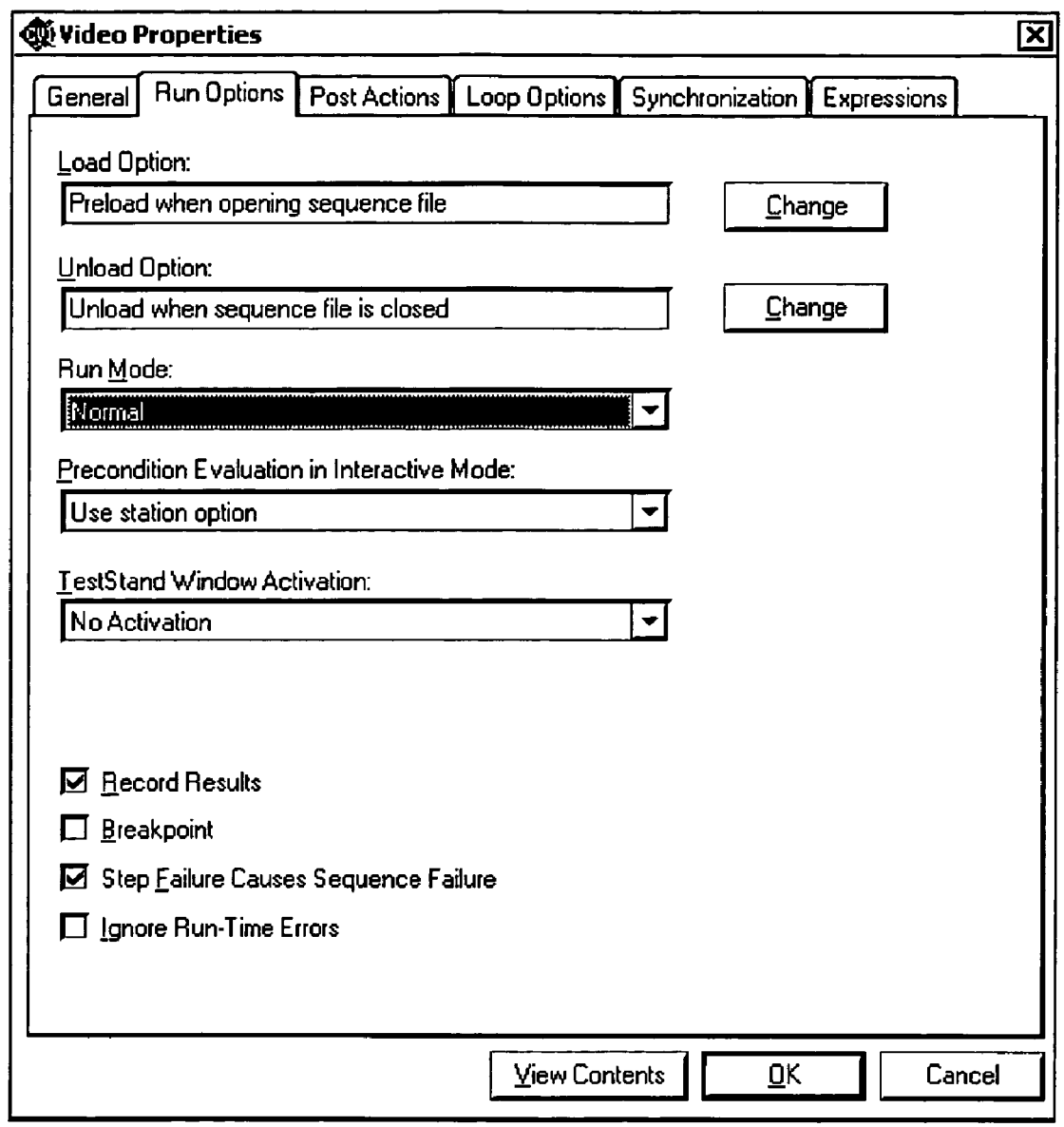
FIG. 5 illustrates an exemplary GUI panel for a test executive step, which enables the user to specify various properties for the step that affect the way the test executive engine manages the execution of the step.

The user may be able to set various properties or parameters for each step that affect the way the test executive engine 220 manages the execution of the step. For example, the sequence editor 212 may provide a dialog box or other graphical user interface for each step with which the user may interact to specify the properties or parameters for the step. For example, FIG. 5 illustrates an exemplary dialog box for the "Video" step of the test executive sequence of FIG. 4. As shown, a "Run Options" property page is selected in FIG. 5. The "Run Options" property page enables the user to specify various options for the step, such as whether to collect test results for the step, whether to break execution when the step is reached, whether to pre-load the step when opening the sequence file, etc. Other property pages in the dialog box of FIG. 5, such as the "General", "Post Actions", "Loop Options", "Synchronization", and "Expressions" pages, enable the user to specify other options or properties for the step. For example, the user may provide input to the "General" page to specify a user-supplied code module for the step to call, e.g., by selecting a file (and possibly a module or function within the file) representing the user-supplied code module.

As described in detail below, in one embodiment the test executive engine 220 may be operable to automatically detect heap corruption errors and/or memory leak errors caused by user-supplied code modules called by a step in a test executive sequence. In one embodiment the sequence editor 212 may provide a graphical user interface for setting various properties related to the heap corruption detection and/or memory leak detection. The sequence editor 212 may allow the user to specify global options related to heap corruption detection or memory leak detection for the entire sequence (such as whether automatic heap corruption detection or memory leak detection is enabled or disabled for the sequence) as well as specify options related to heap corruption detection or memory leak detection for individual steps in the sequence (such as whether automatic heap corruption detection or memory leak detection is enabled or disabled for the individual step).

In one embodiment, the sequence editor 212 may also include an execution window that provides debugging tools for debugging test executive sequences. For example, the test executive application may provide debugging features such as breakpoints, single stepping, tracing, a variable display, and a watch window.

Test Executive Engine

The test executive engine 220 may be used when executing and debugging test executive sequences. The test executive engine 220 may also provide a test executive engine application programming interface (API) that enables another program to interface with the test executive engine 220 in order to perform these actions. For example, a run-time operator interface application may request the test executive engine 220 to execute a test executive sequence, stop execution of the test executive sequence, etc.

In one embodiment, the test executive engine 220 may export an object-based or component-based API, which in one embodiment may be an ActiveX Automation API. The sequence editor 212 and run-time operator interface applications 202 may call the test executive engine API. The engine API may be called from any programming environment able to use the API. For example, where the API comprises an ActiveX Automation API, the engine API may be called from any programming environment that supports access to ActiveX Automation servers. Thus, in various embodiments, the engine API may be called from run-time operator interface applications 202 or test modules written in various programming environments, including those that are written in LabVIEW, LabWindows/CVI, Microsoft Visual C++, Microsoft Visual Basic, Java, etc.

One task performed by the test executive engine 220 is to manage the execution of test executive sequences. Executing a test executive sequence may comprise executing steps included in the test executive sequence. Not all steps in the test executive sequence are necessarily executed. For example, the user may configure some steps to be skipped, e.g., depending on execution results of previous steps.

For a step that calls a user-supplied code module, executing the step may comprise invoking execution of the respective code module. As described above, the user-supplied code module may be constructed in various ways, using any of various kinds of programming languages or application development environments. The user-supplied code module may execute independently from the test executive engine 220 and may possibly be executed under control of its own execution environment or subsystem.

In addition to these user-supplied code modules being executed, for each step, additional program instructions may be executed, wherein these additional program instructions are implemented by the test executive engine 220 itself and provide additional functionality for the step. In other words, these additional program instructions may be program instructions of the test executive software, e.g., program instructions of the test executive engine 220, rather than being defined by the user. As one example, when including a step in a test executive sequence, the user may configure execution results of the step to be collected. In this example, when the step is executed, test executive engine 220 program instructions operable to store the step results accordingly may be executed in addition to the program instructions of a user-supplied code module that the step references.

In some instances, the additional program instructions that are implemented by the test executive engine 220 may be executed before a user-supplied code module called by the step is invoked. In this case, the functionality that is performed before the user-supplied code module is invoked may be referred to as "pre-functionality". In other instances, the additional program instructions that are implemented by the test executive engine 220 may be executed after the user-supplied code module called by the step finishes execution. In this case, the functionality that is performed after the user-supplied code module finishes execution may be referred to as "post-functionality". A step may have pre-functionality and/or post-functionality, or neither.

It is noted that in one embodiment, not all steps of a test executive sequence must call a user-supplied code module. For example, the test executive software may provide some step types that primarily affect various aspects of sequence execution and are not designed to call user-supplied code modules.

As a test executive sequence is executed, various results may be generated. In one embodiment the test executive engine 220 may be operable to automatically collect the results, e.g., may store the results in one or more data structures. In various embodiments, the results may be generated or structured in any of various ways. For example, in one embodiment, there may be one or more results for the unit under test (UUT) as a whole, as well as results for individual steps in the sequence. The results may vary in data type as well.

Test Executive Steps

As described above, a test executive sequence comprises and defines an ordering for a plurality of test executive steps. A test executive step can do many things, such as initializing an instrument, performing a complex test, or making a decision that affects the flow of execution in a test executive sequence. Steps may perform these actions through several types of mechanisms, including jumping to another step, executing an expression, calling a sub-sequence, or calling a user-supplied code module.

Steps may have custom properties which the user can set, e.g., by interacting with a dialog box or other graphical user interface for the step as described above. For steps that call user-supplied code modules, custom step properties may be useful for storing parameters to pass to the user-supplied code module for the step. They may also serve as locations for the user-supplied code module to store its results. The test executive API may be used to access the values of custom step properties from user-supplied code modules.

As described above, in one embodiment not all steps call user-supplied code modules. Some steps may perform standard actions that the user configures using a GUI panel or dialog box. In this case, custom step properties may be useful for storing configuration settings that the user specifies.

Built-In Step Properties

As discussed above, in one embodiment test executive steps in a test executive sequence may have a number of built-in properties or parameters that the user can specify or configure. In one embodiment, built-in step properties may include properties such as:

"Preconditions" that allow the user to specify the conditions that must be true for the test executive engine 220 to execute the step during the normal flow of execution in a sequence.

"Load/Unload Options" that allow the user to specify when the test executive software loads and unloads the code modules or subsequences that each step invokes.

"Run Mode" that allows a step to be skipped or forced to pass or fail without executing the step module.

"Record Results" that allows the user to specify whether the test executive software collects the results of the step.

"Step Failure Causes Sequence Failure" that allows the user to specify whether the test executive software sets the status of the test executive sequence to "Failed" when the status of the step is "Failed".

"Ignore Run-Time Errors" that allows the user to specify whether the test executive sequence continues execution normally after the step even though a run-time error occurs in the step.

"Post Actions" that allows the user to specify the execution of callbacks or jump to other steps after executing the step, depending on the pass/fail status of the step or any custom condition.

"Loop" options that cause a single step to execute multiple times before executing the next step. The user can specify the conditions under which to terminate the loop. The user can also specify whether to collect results for each loop iteration, for the loop as a whole, or for both.

"Pre Expression" that allows the user to specify an expression to be evaluated before executing the step module.

"Post Expression" that allows the user to specify an expression to be evaluated after executing the step module.

"Status Expression" that allows the user to specify an expression to use to set the value of a "status" property of the step automatically.

Figure 6:
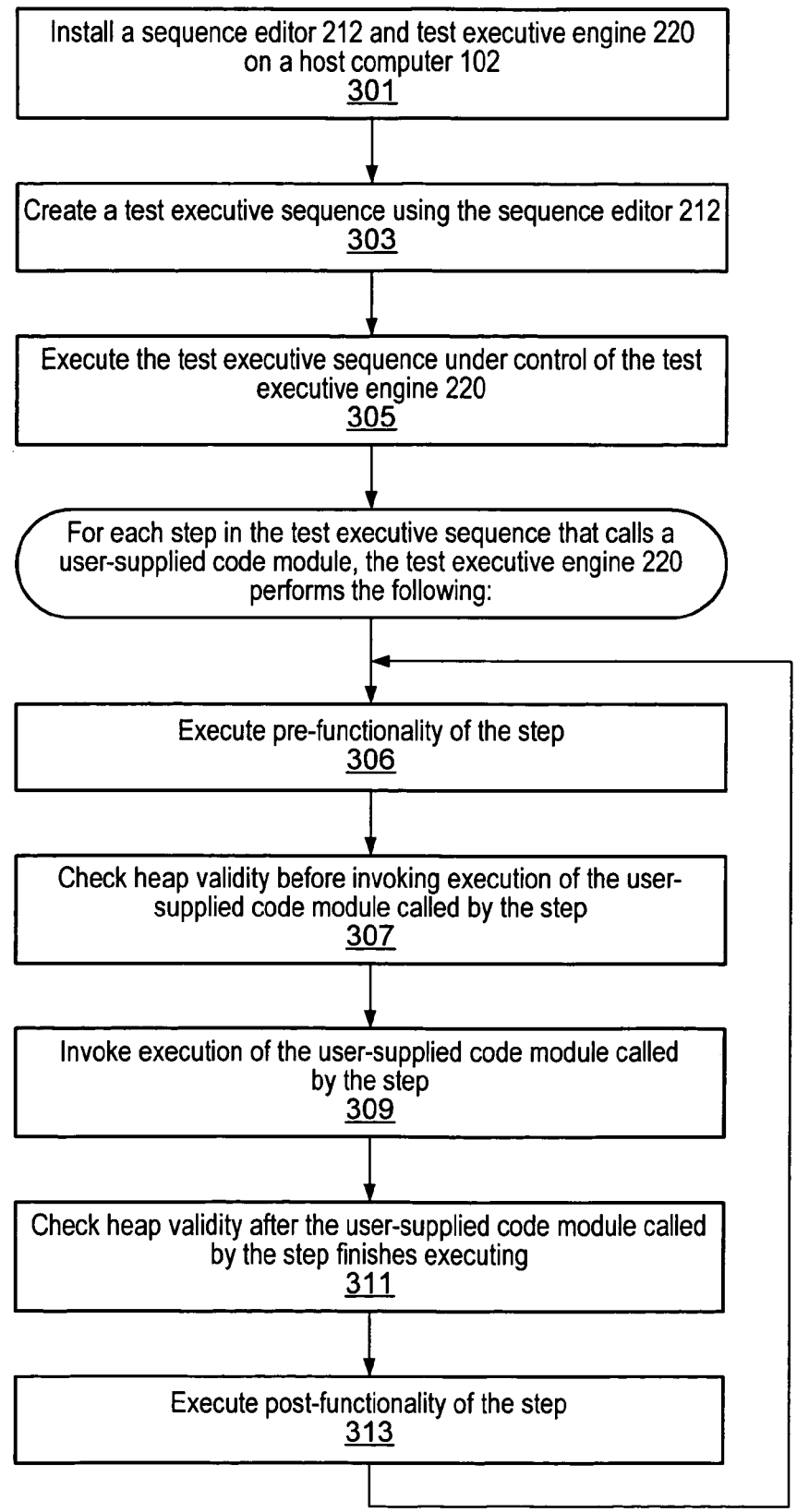
FIG. 6 is a flowchart diagram illustrating one embodiment of a method for automatically detecting heap corruption errors caused by user-supplied code modules that are called by steps of a test executive sequence.

FIG. 6—Automatic Heap Corruption Detection for User-Supplied Code Modules

FIG. 6 is a flowchart diagram illustrating one embodiment of a method for automatically detecting heap corruption errors caused by user-supplied code modules that are called by steps of a test executive sequence. It is noted that FIG. 6 illustrates a representative embodiment, and alternative embodiments are contemplated. Also, various elements may be combined, omitted, or performed in different orders.

In 301, a test executive application may be installed on a first computer system, such as the host computer 102 described above. As used herein, installing the test executive application on a computer system may include enabling the computer system to execute the test executive application. For example, one or more executable files associated with the test executive application or providing access to the test executive application may be installed on the host computer 102. The test executive application may include a sequence editor 212 and a test executive engine 220, as described above.

In 303, a test executive sequence may be created using the test executive application installed in 301. For example, the test executive sequence may be created using the sequence editor 212 of the test executive application, as described above. Creating the test executive sequence may comprise including a plurality of test executive steps in the test executive sequence in response to user input to the sequence editor 212, as described above. The user may also configure each of the steps, e.g., by interacting with a GUI panel or dialog box for each step to set various properties. As described above, at least a subset of the steps in the test executive sequence may call user-supplied code modules. For example, for each step that calls a user-supplied code module, the user may interact with a GUI panel to specify the user-supplied code module to call.

In various embodiments the test executive sequence may be operable to test any of various kinds of units under test (UUT) or physical systems. For example, steps in the test executive sequence may call user-supplied code modules that are operable to connect through one or more hardware devices or instruments to analyze, measure, or control a unit under test (UUT) or process 150, such as described above with reference to FIG. 1.

In 305, the test executive sequence may be executed under control of the test executive application, e.g., under control of the test executive engine 220 supplied by the test executive application. Executing the test executive sequence may comprise executing each of the steps in the test executive sequence. In various embodiments the test executive sequence may be executed to perform any of various kinds of tests on a unit under test (UUT) or process 150. For example, as described above with reference to FIG. 1, the host computer 102 may couple to one or more instruments, and various test executive steps in the test executive sequence may call user-supplied code modules that are operable to connect through the one or more instruments to analyze, measure, or control the unit under test (UUT) or process 150.

FIG. 6 indicates several operations that the test executive engine 220 may perform when executing each step in the test executive sequence. As described above, in one embodiment a step may have "pre-functionality" that is implemented by the test executive engine 220, i.e., functionality to be performed before a user-supplied code module called by the step is executed. In 306 the test executive engine 220 may execute the pre-functionality of the step. In another embodiment the step may not have pre-functionality, and 306 may not be performed.

As described above, user-supplied code modules that contain errors or bugs can cause a heap to become corrupted. In one embodiment it may be desirable to enable the test executive engine 220 to automatically detect heap corruption errors caused by a user-supplied code module called by a step in the test executive sequence. As indicated in FIG. 6, the test executive engine 220 may be operable to perform certain actions related to heap validity checking for each step in the test executive sequence that calls a user-supplied code module. Thus, for a step that calls a user-supplied code module, executing the step may comprise performing the actions indicated in 307, 309, and 311.

For example, as indicated in 307, the test executive engine 220 may check heap validity before invoking execution of the user-supplied code module called by the step. In one embodiment, checking heap validity may comprise checking validity of a single heap. In another embodiment, checking heap validity may comprise checking validity of multiple heaps. For example, checking heap validity may comprise checking validity of one or more heaps known to the test executive engine 220 or checking validity of one or more heaps known to be used by the user-supplied code module that is called by the step. For example, in one embodiment the user may provide input when configuring the test executive sequence in the sequence editor 212 to specify one or more heaps to check for the step (or to check for all steps in the test executive sequence). As one example, the user may specify that a heap used by Microsoft runtime libraries should be checked. The sequence editor 212 may also allow the user to specify any of various other heaps used by other programming environments. In another embodiment the test executive software may be operable to automatically determine one or more heaps that should be checked for validity in 307, e.g., may automatically determine one or more heaps that are used by the user-supplied code module that is called by the step, or the test executive engine 220 may be operable to check validity of one or more heaps by default.

Checking validity of a heap may comprise programmatically determining whether the heap is valid or corrupted. For example, in one embodiment the operating system or programming environment may provide an application programming interface (API) that includes heap validity functions that the test executive engine 220 can call to determine whether the heap is valid or corrupted.

In normal operation, the test executive engine 220 should find that the heap(s) are not corrupted (i.e., are valid) before the user-supplied code module called by the step is invoked for execution. However, if the test executive engine 220 determines that the heap(s) are corrupted then the test executive engine 220 may report or log an error condition.

In 309, the test executive engine 220 may invoke execution of the user-supplied code module called by the step. For example, where the user-supplied code module comprises a function in a DLL, the test executive engine 220 may call the function. As another example, where the user-supplied code module comprises a method of an ActiveX object, the test executive engine 220 may invoke the method. As another example, where the user-supplied code module comprises a graphical program, the test executive engine 220 may invoke execution of the graphical program. In other embodiments the test executive engine 220 may perform any of various other actions to invoke execution of the user-supplied code module, depending on the implementation of the module.

Depending on the implementation or type of the user-supplied code module, in one embodiment the module may be executed in an execution environment or an execution subsystem that is separate from the test executive application. For example, where the user-supplied code module comprises a graphical program, the module may be executed by an execution subsystem of a graphical programming system. As another example, where the user-supplied code module comprises a Java™ module, the module may be executed within a Java™ execution environment. In one embodiment the user-supplied code module may be executed in a different process other than the process in which the test executive engine 220 executes.

After the user-supplied code module finishes executing, the test executive engine 220 may check heap validity again, as indicated in 311, i.e., may check validity of the same heap(s) as in 307. In normal operation, the test executive engine 220 should find that the heap(s) are not corrupted (i.e., are valid) after the user-supplied code module called by the step is executed. If the test executive engine 220 finds that one or more heaps are corrupted and these heaps were not corrupted before the user-supplied code module was executed then the heap corruption was most likely caused by the user-supplied code module.

If the test executive engine 220 determines that the user-supplied code module caused the heap(s) to become corrupted then the test executive engine 220 may be operable to report an error in response. In one embodiment the test executive engine 220 may stop execution of the test executive sequence and may display information on the display of the host computer 102 indicating that the user-supplied code module caused the heap(s) to become corrupted. The test executive engine 220 may also display other information on the display, such as information returned by the heap validity function(s) called by the test executive engine 220. In another embodiment the test executive engine 220 may continue executing the test executive sequence but may log the error, e.g., may log the error in a test results report for the test executive sequence, in a file, or in a database, etc.

As described above, in one embodiment a step may have "post-functionality" that is implemented by the test executive engine 220, i.e., functionality to be performed after a user-supplied code module called by the step is executed. In 313 the test executive engine 220 may execute the post-functionality of the step. In another embodiment the step may not have post-functionality, and 313 may not be performed.

In one embodiment the test executive engine may be operable to execute the test executive sequence in different modes, e.g., in either a debug mode or a production mode. In one embodiment the action taken in response to discovering that a user-supplied code module called by a step in the sequence caused a heap corruption error may depend on which mode the test executive sequence is executed in. For example, if the test executive sequence is executed in debug mode then the test executive engine 220 may stop execution of the test executive sequence immediately in response to discovering the error. If the test executive sequence is executed in production mode then the test executive engine 220 may continue executing the test executive sequence but may log the error. In one embodiment the user may be able to specify desired behavior to take in response to discovering a heap corruption error caused by a user-supplied code module. For example, the test executive software may provide a GUI panel with various options that the user can set to specify desired behavior related to discovering and handling heap corruption errors.

In one embodiment, the test executive engine 220 may be configured to perform heap validity checking when the test executive sequence is executed in debug mode but not when the test executive sequence is executed in production mode. Executing the test executive sequence without performing the heap validity checking may increase execution performance of the test executive sequence. In one embodiment the user may be able to turn heap validity checking on and off as desired, or the user may specify that heap validity checking should only be performed when executing the test executive sequence in certain execution modes, e.g., in debug mode. For example, the user may interact with a GUI panel to set these options.

In one embodiment the test executive engine 220 may be configured to check heap validity after each user-supplied code module is executed, but may not check heap validity before the user-supplied code modules are invoked for execution. In other words, in one embodiment 311 of FIG. 6 may be performed, but not 307. By not performing the heap validity checking before each user-supplied code module is executed, the certainty that a user-supplied code module is responsible for a heap corruption error may be slightly decreased, but execution performance of the test executive sequence may be slightly increased.

The above-described method of automatically detecting heap corruption errors caused by user-supplied code modules may benefit users by informing them of bugs in their code modules of which they were not aware or by helping them to track down the source of a problem encountered during execution of the test executive sequence.

Figure 7:
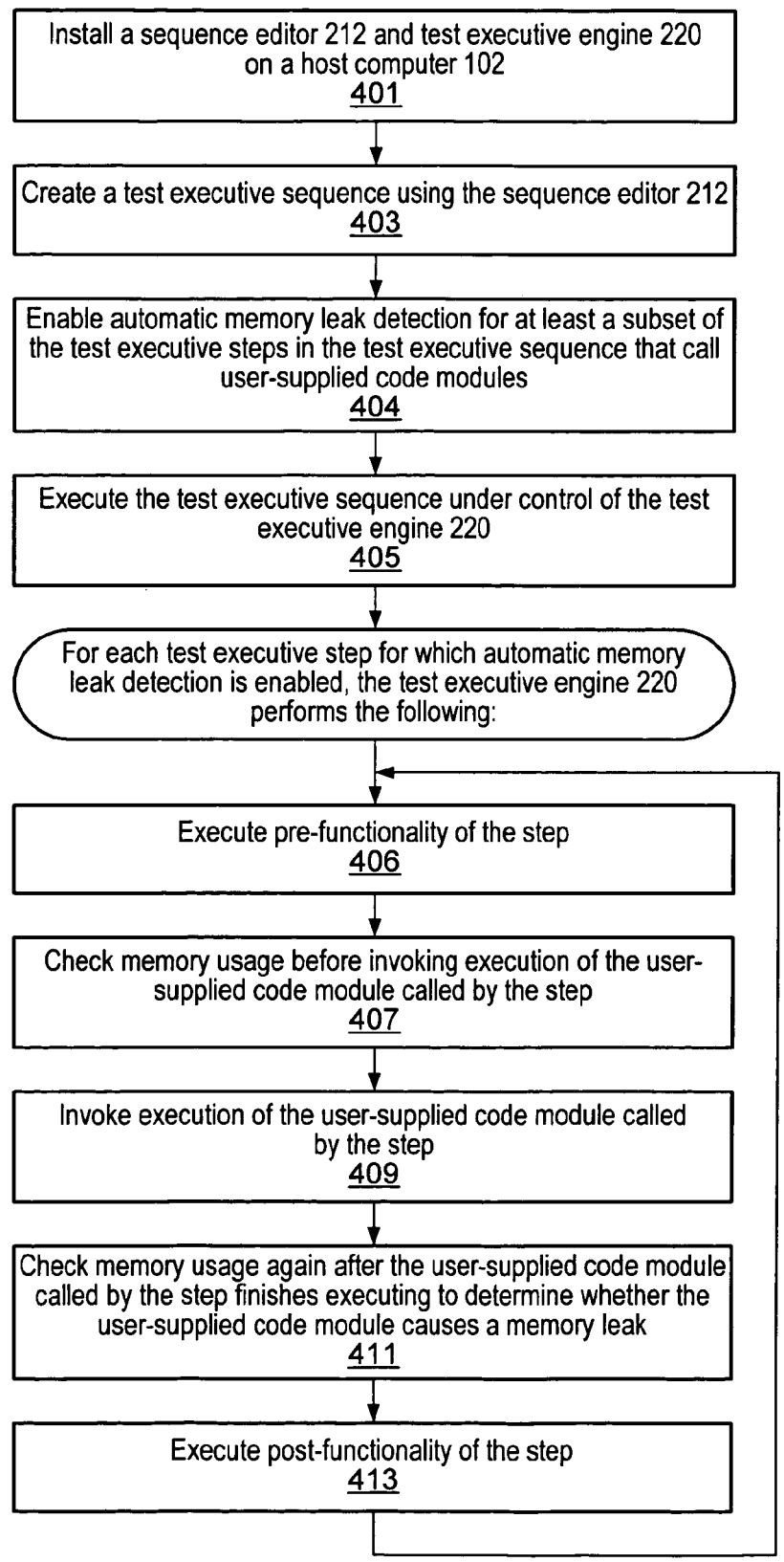
FIG. 7 is a flowchart diagram illustrating one embodiment of a method for automatically detecting memory leaks caused by user-supplied code modules that are called by steps of a test executive sequence.

FIG. 7—Automatic Memory Leak Detection for User-Supplied Code Modules

FIG. 7 is a flowchart diagram illustrating one embodiment of a method for automatically detecting memory leaks caused by user-supplied code modules that are called by steps of a test executive sequence. It is noted that FIG. 7 illustrates a representative embodiment, and alternative embodiments are contemplated. Also, various elements may be combined, omitted, or performed in different orders.

In 401, a test executive application may be installed on a first computer system, e.g., a host computer 102, similarly as described above with reference to 301 of FIG. 6. The test executive application may include a sequence editor 212 and a test executive engine 220, as described above.

In 403, a test executive sequence may be created using the test executive application installed in 401, similarly as described above with reference to 303 of FIG. 6. For example, the test executive sequence may be created using the sequence editor 212 of the test executive application, as described above. Creating the test executive sequence may comprise including a plurality of test executive steps in the test executive sequence in response to user input to the sequence editor 212, as described above. The user may also configure each of the steps, e.g., by interacting with a GUI panel or dialog box for each step to set various properties. As described above, at least a subset of the steps in the test executive sequence may call user-supplied code modules. For example, for each step that calls a user-supplied code module, the user may interact with a GUI panel to specify the user-supplied code module to call.

In 404, automatic memory leak detection may be enabled or turned on for at least a subset of the test executive steps in the test executive sequence that call user-supplied code modules. As described below, for each test executive step for which automatic memory leak detection is enabled, the test executive engine 220 may be operable to perform certain actions when the step is executed to check whether the user-supplied code module called by the step causes a memory leak.

In one embodiment the user may provide user input indicating which steps to perform automatic memory leak detection for during execution of the test executive sequence. For example, for each step in the sequence for which the user desires automatic memory leak detection to be performed, the user may set an option to enable the automatic memory leak detection, e.g., by interacting with a GUI panel or dialog box for the step.

In another embodiment, automatic memory leak detection may be performed by default for every step in the test executive sequence that calls a user-supplied code module. In this embodiment the test executive application may allow the automatic memory leak detection to be disabled or turned off for certain steps in the test executive sequence if desired. For example, some user-supplied code modules may be designed to not release all the memory they have allocated before they finish execution. Thus, the automatic memory leak detection may be disabled for steps that call such user-supplied code modules so that memory leaks are not reported for these steps.

In 405, the test executive sequence may be executed under control of the test executive application, e.g., under control of the test executive engine 220 supplied by the test executive application, similarly as described above with reference to 305 of FIG. 6.

For each step in the test executive sequence for which automatic memory leak detection is enabled, FIG. 7 indicates several operations that the test executive engine 220 may perform when executing the step. As described above, in one embodiment a step may have "pre-functionality" that is implemented by the test executive engine 220, i.e., functionality to be performed before a user-supplied code module called by the step is executed. In 406 the test executive engine 220 may execute the pre-functionality of the step. In another embodiment the step may not have pre-functionality, and 406 may not be performed.

In 407 the test executive engine 220 may check memory usage before invoking execution of the user-supplied code module called by the step. Checking memory usage may comprise checking or measuring the amount of memory in use for one or more memory pools or stores, i.e., for the memory pool(s) for which memory leak detection is performed. In various embodiments, memory usage for any kind of memory pool may be checked. In one embodiment, checking memory usage in 407 may comprise checking the amount of memory in use for or currently allocated for one or more heaps. Thus the test executive engine 220 may be operable to determine whether the user-supplied code module called by the step causes a memory leak with respect to the heap(s), as described below. In various embodiments, memory usage for a memory pool may be checked in any of various ways, e.g., depending on the type of and implementation of the memory pool. For example, in one embodiment the memory pool may have an associated application programming interface (API) which includes various memory management functions which the test executive engine 220 can call to determine the amount of memory in use for the memory pool. For example, the test executive engine 220 may call a function to determine an amount of allocated memory for a heap.

In 409, the test executive engine 220 may invoke execution of the user-supplied code module called by the step, similarly as described above with reference to 309 of FIG. 6.

In 411 the test executive engine 220 may again check memory usage after the user-supplied code module called by the step finishes executing, e.g., may check memory usage for the one or more heaps or other memory pools that were previously checked in 407. For each memory pool for which memory usage is checked, the test executive engine 220 may compare the memory usage for the memory pool after the user-supplied code module finishes executing to the memory usage for the memory pool before the user-supplied code module was executed to determine whether the user-supplied code module caused a memory leak for the memory pool. For convenience, the term "MemoryBefore" is used below to refer to the memory usage for a memory pool (e.g., the amount of memory in use for or allocated for the memory pool) before the user-supplied code module called by the step is executed. The term "MemoryAfter" is used below to refer to the memory usage for a memory pool (e.g., the amount of memory in use for or allocated for the memory pool) after the user-supplied code module called by the step finishes executing.

In various embodiments, different criteria may be used to determine whether a memory leak has occurred in a memory pool, based on the MemoryBefore and MemoryAfter values. For example, in one embodiment it may be considered a memory leak if MemoryAfter is greater than MemoryBefore by any amount. In another embodiment the test executive software, e.g., the sequence editor 212, may allow the user to specify a threshold memory amount for determining whether a memory leak has occurred. For example, it may be considered a memory leak only if MemoryAfter is greater than MemoryBefore by at least the threshold memory amount.

In one embodiment the user may specify a global threshold memory amount which is used for all steps in the test executive sequence. In another embodiment the user may be able to specify different threshold memory amounts for different steps that call different user-supplied code modules, or the user may be able to specify a threshold memory amount for an individual step to override the global threshold memory amount.

In another embodiment the test executive engine 220 may utilize a threshold memory amount in determining whether the user-supplied code module caused a memory leak, similarly as described above, but the threshold memory amount that is utilized may be a fixed value or may be automatically chosen by the test executive engine 220 instead of being specified by the user. For example, when determining whether the user-supplied code module caused a memory leak for a heap, the test executive engine 220 may choose a threshold memory amount based on knowledge of the heap implementation or knowledge of memory allocation policies used by the heap.

If the test executive engine 220 determines that the user-supplied code module caused a memory leak in one or more heaps or other memory pools then the test executive engine 220 may be operable to report an error in response. In one embodiment the test executive engine 220 may stop execution of the test executive sequence and may display information on the display of the host computer 102 indicating that the user-supplied code module caused a memory leak. The test executive engine 220 may also display other information on the display, such as an indication of how much memory was leaked. In another embodiment the test executive engine 220 may continue executing the test executive sequence but may log the error, e.g., may log the error in a test results report for the test executive sequence, in a file, or in a database, etc.

In one embodiment the test executive engine may be operable to execute the test executive sequence in different modes, e.g., in either a debug mode or a production mode. In one embodiment the action taken in response to discovering that a user-supplied code module called by a step in the sequence caused a memory leak may depend on which mode the test executive sequence is executed in, similarly as described above with reference to FIG. 6. Also, in one embodiment, the test executive engine 220 may be configured to perform automatic memory leak detection when the test executive sequence is executed in debug mode but not when the test executive sequence is executed in production mode.

As described above, in one embodiment the step may have "post-functionality" that is implemented by the test executive engine 220, i.e., functionality to be performed after the user-supplied code module called by the step is executed. In 413 the test executive engine 220 may execute the post-functionality of the step. In another embodiment the step may not have post-functionality, and 413 may not be performed.

The above-described method of automatically detecting memory leak errors caused by user-supplied code modules may benefit users by informing them of bugs in their code modules of which they were not aware or by helping them to track down the source of a problem encountered during execution of the test executive sequence.

It is noted that various embodiments may further include receiving, sending or storing instructions and/or data implemented in accordance with the foregoing description upon a carrier medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-readable memory medium comprising program instructions executable to:
   include a plurality of test executive steps in a test executive sequence in response to user input;
   configure each test executive step of the plurality of test executive steps to call a respective user-supplied code module in response to user input;
   display a graphical user interface for configuring execution options for the test executive sequence; and
   receive user input to the graphical user interface enabling heap corruption detection for user-supplied code modules invoked by test executive steps during execution of the test executive sequence; and
   execute the test executive sequence, wherein said executing comprises executing each test executive step of the plurality of test executive steps;
   wherein for each test executive step of the plurality of test executive steps, said executing the test executive step comprises:
      invoking execution of the respective user-supplied code module called by the test executive step; and
      in response to determining that the heap corruption detection for user-supplied code modules is enabled, checking validity of a first heap after the respective user-supplied code module called by the test executive step finishes execution to determine whether the respective user-supplied code module caused the first heap to become corrupted.

2. The computer-readable memory medium of claim 1, wherein for each test executive step of the plurality of test executive steps, said executing the test executive step further comprises:
   in response to determining that the heap corruption detection for user-supplied code modules is enabled, checking validity of the first heap before invoking the execution of the respective user-supplied code module called by the test executive step to determine whether the first heap is corrupted before the respective user-supplied code module is executed.

3. The computer-readable memory medium of claim 1, wherein one or more test executive steps of the plurality of test executive steps have pre-functionality, wherein the pre-functionality for each of the one or more test executive steps comprises functionality to be performed before invoking the execution of the respective user-supplied code module called by the test executive step;
wherein for each of the one or more test executive steps that have pre-functionality, said executing the test executive step further comprises executing the pre-functionality of the step before invoking the execution of the respective user-supplied code module called by the test executive step.

4. The computer-readable memory medium of claim 1, wherein one or more test executive steps of the plurality of test executive steps have post-functionality, wherein the post-functionality for each of the one or more test executive steps comprises functionality to be performed after the respective user-supplied code module called by the test executive step finishes execution;
wherein for each of the one or more test executive steps that have post-functionality, said executing the test executive step further comprises executing the post-functionality of the step after the respective user-supplied code module called by the test executive step finishes execution.

5. The computer-readable memory medium of claim 1, wherein the plurality of test executive steps includes a particular test executive step configured to call a particular user-supplied code module;
wherein the program instructions are further executable to:
in response to checking validity of the first heap after the particular user-supplied code module called by the particular test executive step finishes execution, determine that the particular user-supplied code module caused the first heap to become corrupted; and
stop execution of the test executive sequence in response to determining that the particular user-supplied code module caused the first heap to become corrupted.

6. The computer-readable memory medium of claim 1, wherein the plurality of test executive steps includes a particular test executive step configured to call a particular user-supplied code module;
wherein the program instructions are further executable to:
in response to checking validity of the first heap after the particular user-supplied code module called by the particular test executive step finishes execution, determine that the particular user-supplied code module caused the first heap to become corrupted; and
report an error in response to determining that the particular user-supplied code module caused the first heap to become corrupted.

7. The computer-readable memory medium of claim 1, wherein for each test executive step of the plurality of test executive steps, said executing the test executive step further comprises:
checking validity of a second heap after the respective user-supplied code module called by the test executive step finishes execution to determine whether the respective user-supplied code module caused the second heap to become corrupted.

8. The computer-readable memory medium of claim 1, wherein the graphical user interface is a first graphical user interface;
wherein the program instructions are further executable to display a second graphical user interface for creating the test executive sequence;
wherein said including the plurality of test executive steps in the test executive sequence is performed in response to user input received to the second graphical user interface requesting inclusion of the plurality of test executive steps in the test executive sequence.

9. The computer-readable memory medium of claim 1, wherein for each test executive step of the plurality of test executive steps, the program instructions are further executable to display a step configuration graphical user interface for configuring the test executive step;
wherein for each test executive step of the plurality of test executive steps, the test executive step is configured to call a respective user-supplied code module in response to user input received to the step configuration graphical user interface specifying the respective user-supplied code module.

10. The computer-readable memory medium of claim 1, wherein for a first test executive step of the plurality of test executive steps, said invoking the execution of the respective user-supplied code module called by the first test executive step comprises one of:
calling a function in a DLL;
invoking a method of an ActiveX object; or
invoking execution of a graphical program.

11. The computer-readable memory medium of claim 1, wherein said executing the test executive sequence comprises executing the test executive sequence under control of a test executive engine;
wherein the test executive engine is operable to perform said checking validity of the first heap.

12. A computer-implemented method for discovering a heap corruption error caused by a test executive sequence, the method comprising:
including a plurality of test executive steps in the test executive sequence in response to user input;
configuring each test executive step of the plurality of test executive steps to call a respective user-supplied code module in response to user input;
displaying a graphical user interface for configuring execution options for the test executive sequence; and
receiving user input to the graphical user interface enabling heap corruption detection for user-supplied code modules invoked by test executive steps during execution of the test executive sequence; and
executing the test executive sequence, wherein said executing comprises executing each test executive step of the plurality of test executive steps;
wherein for each test executive step of the plurality of test executive steps, said executing the test executive step comprises:
invoking execution of the user-supplied code module called by the test executive step; and
in response to determining that the heap corruption detection for user-supplied code modules is enabled, checking validity of a first heap after the respective user-supplied code module called by the test executive step finishes execution to determine whether the respective user-supplied code module caused the first heap to become corrupted.

13. The method of claim 12, wherein for each test executive step of the plurality of test executive steps, said executing the test executive step further comprises:
in response to determining that the heap corruption detection for user-supplied code modules is enabled, checking validity of the first heap before invoking the execution of the respective user-supplied code module called by the test executive step to determine whether the first heap is corrupted before the respective user-supplied code module is executed.

14. The method of claim 12, wherein one or more test executive steps of the plurality of test executive steps have pre-functionality, wherein the pre-functionality for each of the one or more test executive steps comprises functionality to be performed before invoking the execution of the respective user-supplied code module called by the test executive step;

wherein for each of the one or more test executive steps that have pre-functionality, said executing the test executive step further comprises executing the pre-functionality of the step before invoking the execution of the respective user-supplied code module called by the test executive step.

15. The method of claim 12, wherein one or more test executive steps of the plurality of test executive steps have post-functionality, wherein the post-functionality for each of the one or more test executive steps comprises functionality to be performed after the respective user-supplied code module called by the test executive step finishes execution;

wherein for each of the one or more test executive steps that have post-functionality, said executing the test executive step further comprises executing the post-functionality of the step after the respective user-supplied code module called by the test executive step finishes execution.

16. The method of claim 12, wherein the plurality of test executive steps includes a particular test executive step configured to call a particular user-supplied code module;

wherein the method further comprises:

in response to checking validity of the first heap after the particular user-supplied code module called by the particular test executive step finishes execution, determining that the particular user-supplied code module caused the first heap to become corrupted; and stopping execution of the test executive sequence in response to determining that the particular user-supplied code module caused the first heap to become corrupted.

17. The method of claim 12, wherein the plurality of test executive steps includes a particular test executive step configured to call a particular user-supplied code module;

wherein the method further comprises:

in response to checking validity of the first heap after the particular user-supplied code module called by the particular test executive step finishes execution, determining that the particular user-supplied code module caused the first heap to become corrupted; and reporting an error in response to determining that the particular user-supplied code module caused the first heap to become corrupted.

18. The method of claim 12, wherein for each test executive step of the plurality of test executive steps, said executing the test executive step further comprises:

checking validity of a second heap after the respective user-supplied code module called by the test executive step finishes execution to determine whether the respective user-supplied code module caused the second heap to become corrupted.

19. The method of claim 12, wherein said executing the test executive sequence comprises executing the test executive sequence under control of a test executive engine;

wherein the test executive engine is operable to perform said checking validity of the first heap.

20. A system comprising:

a sequence editor;

a test executive engine;

a host computer configured to execute the sequence editor and the test executive engine; and a unit under test (UUT) coupled to the host computer;

wherein the host computer is configured to execute the sequence editor to create a test executive sequence for testing the UUT, wherein said creating the test executive sequence comprises including a plurality of test executive steps in the test executive sequence in response to user input to the sequence editor and configuring each test executive step of the plurality of test executive steps to call a respective user-supplied code module in response to user input to the sequence editor;

wherein the host computer is further configured to display a graphical user interface for configuring execution options for the test executive sequence and receive user input to the graphical user interface enabling heap corruption detection for user-supplied code modules invoked by test executive steps during execution of the test executive sequence;

wherein the host computer is further configured to execute the test executive engine, wherein the test executive engine is operable to control execution of the test executive sequence, wherein said controlling execution of the test executive sequence comprises causing each test executive step of the plurality of test executive steps to be executed on the host computer;

wherein for each test executive step of the plurality of test executive steps, the test executive engine is operable to:

invoke the respective user-supplied code module called by the test executive step for execution on the host computer; and in response to determining that the heap corruption detection for user-supplied code modules is enabled, check validity of a first heap after the respective user-supplied code module called by the test executive step finishes execution to determine whether the respective user-supplied code module caused the first heap to become corrupted.

21. The system of claim 20, wherein for each test executive step of the plurality of test executive steps, the test executive engine is further operable to:

in response to determining that the heap corruption detection for user-supplied code modules is enabled, check validity of the first heap before said invoking the respective user-supplied code module called by the test executive step to determine whether the first heap is corrupted before the respective user-supplied code module is executed.

22. The system of claim 20, wherein one or more test executive steps of the plurality of test executive steps have pre-functionality, wherein the pre-functionality for each of the one or more test executive steps comprises functionality to be performed before executing the respective user-supplied code module called by the test executive step, wherein the pre-functionality for each of the one or more test executive steps is implemented by the test executive engine;

wherein for each of the one or more test executive steps that have pre-functionality, the test executive engine is further operable to execute the pre-functionality of the step before said invoking the respective user-supplied code module called by the step.

23. The system of claim 20,
wherein one or more test executive steps of the plurality of test executive steps have post-functionality, wherein the post-functionality for each of the one or more test executive steps comprises functionality to be performed after executing the respective user-supplied code module called by the test executive step, wherein the post-functionality for each of the one or more test executive steps is implemented by the test executive engine;

wherein for each of the one or more test executive steps that have post-functionality, the test executive engine is further operable to execute the post-functionality of the step after said invoking the respective user-supplied code module called by the step.

* * * * *